July 3, 1928.

C. F. GLASS ET AL

1,676,020

FINGERPRINT MACHINE

Filed Oct. 17, 1924

C. F. Glass
A. C. O. Bock and
J. F. Milligan
INVENTORS
BY
Thomas Howe
ATTORNEY

July 3, 1928.

C. F. GLASS ET AL 1,676,020

FINGERPRINT MACHINE

Filed Oct. 17, 1924

C. F. Glass
A. C. O. Bock and INVENTORS
J. F. Milligan
BY
Thomas Howe ATTORNEY

July 3, 1928.

C. F. GLASS ET AL

1,676,020

FINGERPRINT MACHINE

Filed Oct. 17, 1924

C. F. GLASS ET AL

1,676,020

FINGERPRINT MACHINE

Filed Oct. 17, 1924

Patented July 3, 1928.

1,676,020

UNITED STATES PATENT OFFICE.

CHARLES F. GLASS AND ALFRED CHARLES OTTO BOCK, OF BROOKLYN, NEW YORK, AND JOHN F. MILLIGAN, OF RIDGEFIELD PARK, NEW JERSEY, ASSIGNORS TO FINGER-PRINT MACHINE CORPORATION, A CORPORATION OF NEW YORK.

FINGERPRINT MACHINE.

Application filed October 17, 1924. Serial No. 744,161.

This invention relates to means for recording finger prints.

The main object of the invention is to provide apparatus of the character indicated which shall be motor operated throughout the entire cycle of its operation.

A further object of the invention is to provide improved means for handling the pigment.

A further object of the invention is to provide an improved means for supporting and conveying the paper upon which the impression is made.

A further object of the invention is to provide an improved means for adjusting the heater for fixing the pigment and for mounting the same.

A further object of the invention is to provide controlling means for the motor operated apparatus so that it will operate in the desired manner.

A further object of the invention is to so proportion and arrange the cooperating parts that they will function to produce the desired results.

Other and ancillary objects of the invention will appear hereinafter.

In the accompanying drawings which illustrate the invention:—

Referring to the drawings, the apparatus comprises generally a casing A within which is a rotatably mounted table or support B for the sheet of paper on which the finger print is to be formed, a hopper C for containing powdered pigment and a heater D for fixing the pigment, the rotating table holding the impressed sheet successively in position to receive the pigment powder from the hopper and in position to expose the pigment powder clinging to the finger lines, to the heat of the hopper so as to fix the pigment in the said lines. Upon the exterior of the casing is an operating handle E by means of which is initiated the operation of spring motor mechanism F whereby the table B is operated, and other ancillary operations performed.

Referring now to the structure more in detail the sheet carrier B comprises a rectangular frame 1 supported on legs 2 and 3 which are rotatable upon the shaft 4 fixed in the casing and in the partition 5 extending across the casing.

The legs 2 and 3 extending to the other side of the shaft 4 and the bar 6 extending between them serves as a counterweight for the sheet supporting table. The frame 1 has a rectangular central opening adapted to be closed by a rectangular plate 7 hinged to the frame at 8. The purpose of this plate is to provide a support for the impressed sheet beneath the point of impression of the fingers. It is not desired, however, that the metal of the support should be in close proximity to the sheet when it is before the fixing heater as will be hereinafter referred to as it is likely to cause irregularity in the heating effect upon the paper so that the product may be either under or over heat treated. Thus if the metal supporting plate were against the back of the paper at all times, when the apparatus was cold an adjustment of the heating for that condition would produce overheating or scorching when the plate had become warm from use and the degree to which it would be warmed by use would depend upon the rapidity of operation. The result would be that a given adjustment of the heating would produce non-uniform and unsatisfactory products. Accordingly arrangements are made whereby the plate 7 is held in proximity to the paper at the time the finger is impressed but is removed therefrom to a considerable distance so as to have practically no effect on the heating operation, when the sheet is in position before the heater. This is brought about in the following manner:

A spring 9 secured to the bar 6 at one end and to the plate 7 at its other end tends to turn that plate upon its hinges 8 and move it away from the sheet upon the table. This movement under the action of the spring, however, is controlled by a cam member 10 fixed upon the shaft 4. In the position of impression of the fingers it will be seen (Fig. 4) that the plate 7 is held in the plane of the frame 1 and against the paper to be impressed. As the table turns from this position to the left (Fig. 4) it will pass about the point 11 of the cam into a position where the plane of the frame 1 will be substantially parallel to the cam face 12 and against which the plate 7 will be drawn when it will be retracted a considerable distance back of the impressed paper. As the table continues its rotation about the shaft 4 the plate 7 will pass into engagement with the cam surface 13 which is concentric with the shaft 4 and during its travel in contact with this surface the plate 7 will be held at a fixed distance back of the plane of the frame 1. The table still proceeding the paper will, in front of the heater, be in a substantially vertical position and the plate 7 will be against the surface 14 of the cam.

Figure 4:
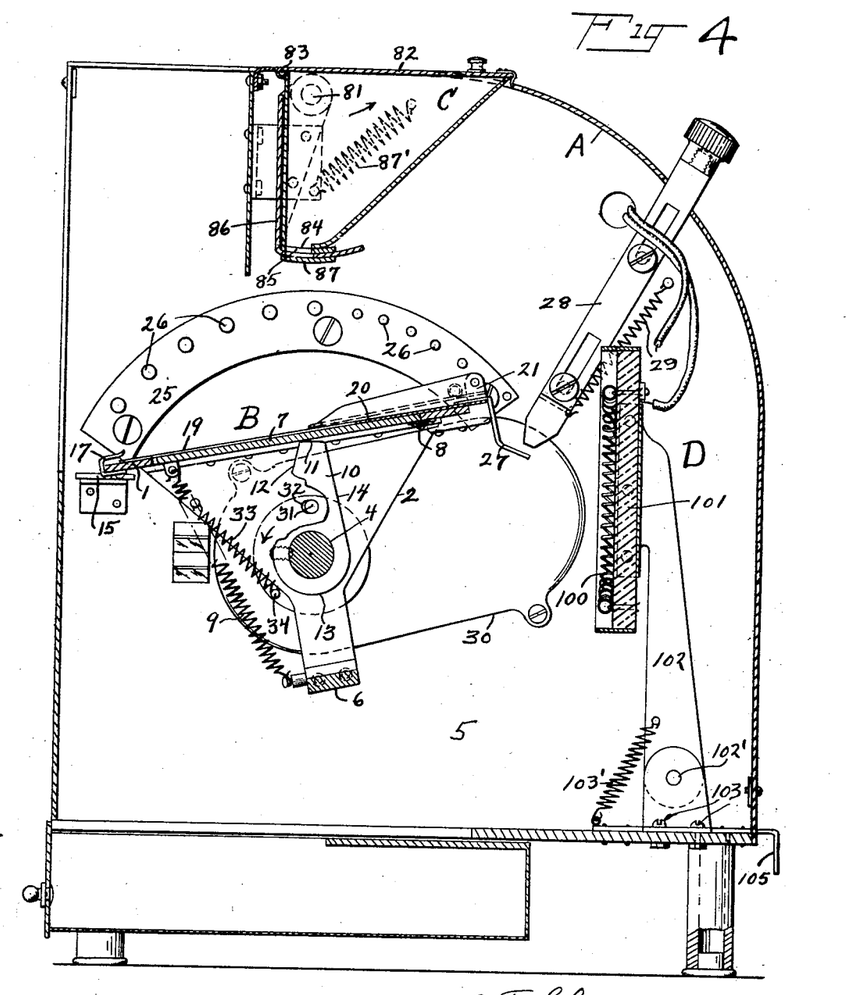
Fig. 4 is a section on the line 4—4 of Fig. 3.
Figure 5:
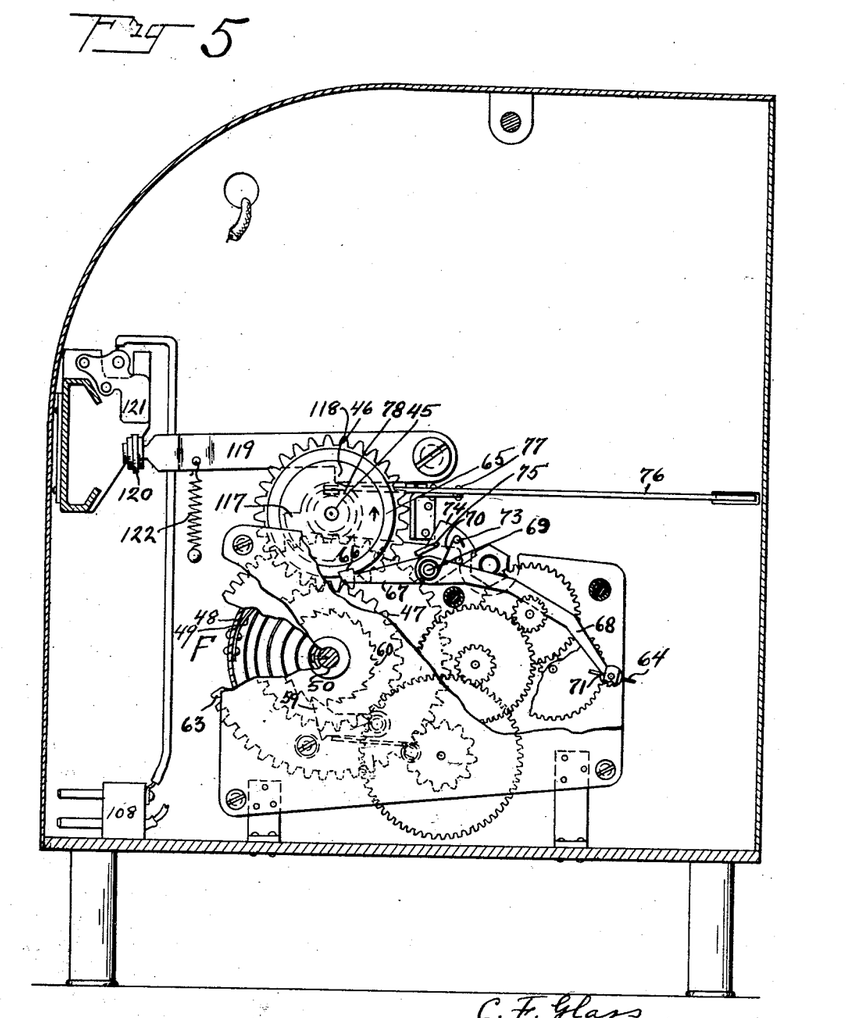
Fig. 5 is a section on the line 5—5 of Fig. 3, partly broken away.

The paper carrier will here dwell for an appropriate time to permit the proper heat treatment of the print and then proceeding onwardly will return to its initial position as shown in Fig. 4, the plate 7 having been forced back into its position in the plane of the frame 1 by the cam 10 in such passage.

In order to firmly hold the paper table in position during the operation of impressing the fingers a reciprocating support 15 sliding in the partition 5 projects beneath the frame 1, this support being withdrawn to permit the table to start its revolution. The means for thus operating the support will appear hereinafter.

Figure 1:
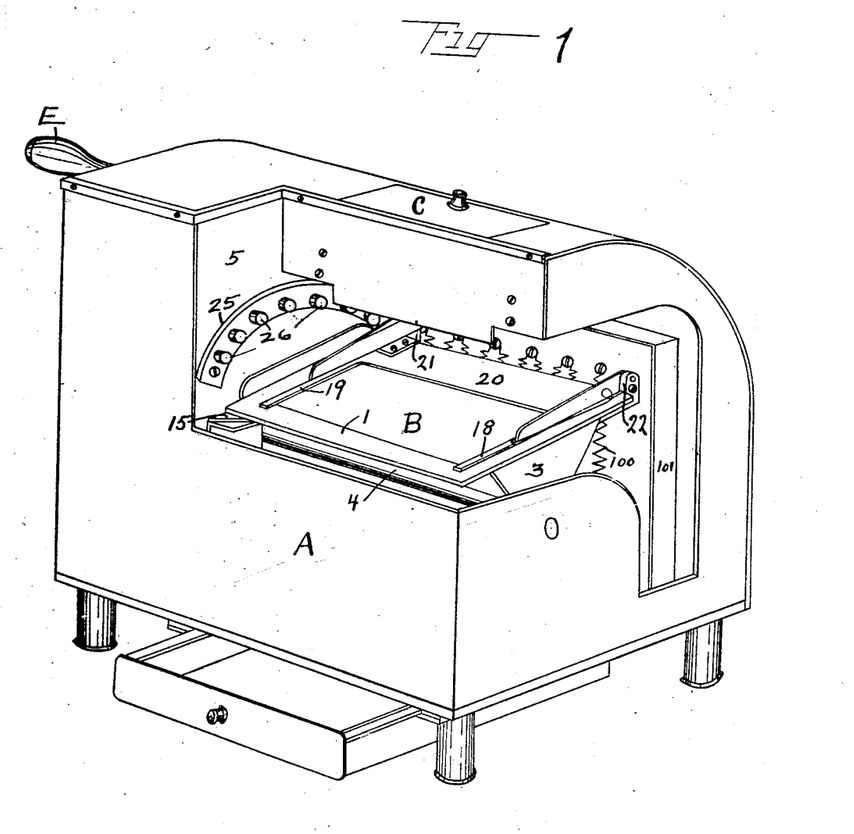
Fig. 1 is a perspective view of a machine embodying the invention.
Figure 2:
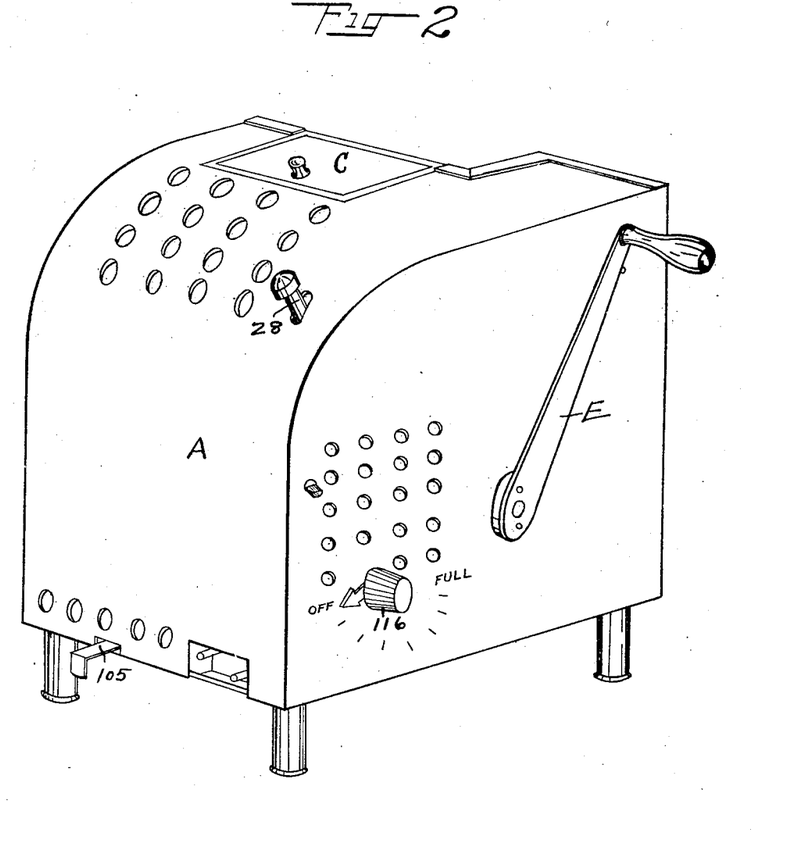
Fig. 2 is a perspective view from another angle of the machine of Fig. 1.
Figure 3:
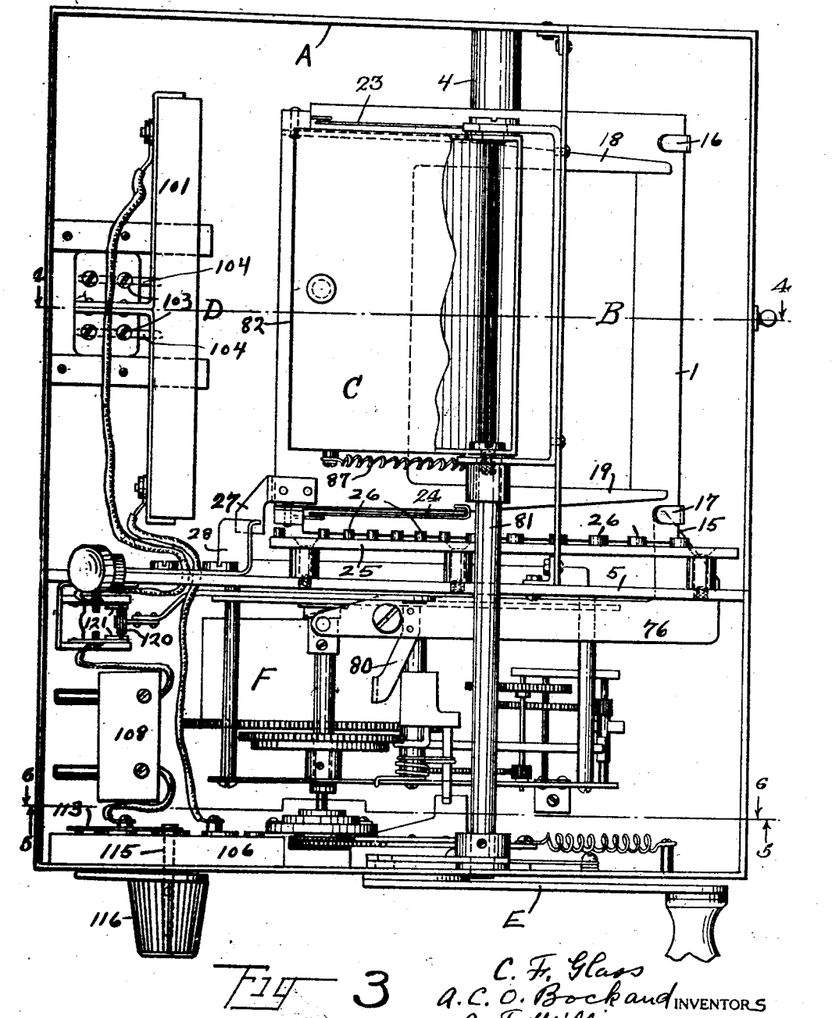
Fig. 3 is a top plan view with the casing removed and on an enlarged scale, of the finger print machine as shown in Figs. 1 and 2.

To secure the paper to be impressed upon the table, clips 16 and 17 are secured to one edge of the frame 1 and adapted to receive an edge of the paper within them. Also fingers 18 and 19 which extend along two sides of the frame 1 are secured to a plate 20 hinged at 21 and 22 to the frame 1, these fingers being pressed toward the frame 1 by springs 23 and 24 (see Fig. 3) so that the paper which is placed beneath the fingers is clamped between them and the frame 1.

Secured to the partition 5 is a segment 25 having a series of projections 26 extending into the path of an arm 27 fixed to the plate 20 so that as the paper carrier rotates the arm will, in passing each of the projections, cause the fingers 18 and 19 to be moved from the frame 1 and when the arm 27 clears the projection the fingers will snap back against the paper thereby jarring it and aiding to dislodge any superfluous pigment which may be upon the paper to facilitate its sliding off of the sheet when the last is at an angle to the horizontal.

In order to facilitate the placing of the paper sheet beneath the fingers 18 and 19 they may be raised by means of a plunger 28 sliding upon the partition 5 and extending to the exterior of the casing, this plunger being normally retracted sufficiently to permit the passage of the arm 27, by means of a spring 29. When the paper carrier is in its initial position, however, (see Fig. 4) the plunger 28 may be moved inwardly by pressure of the finger on its outer end when it will come against the arm 27 and raise the fingers 18 and 19 so that the paper to be impressed may be placed against the frame 1 and beneath the fingers.

The paper carriage is driven by a gear in a casing 30 which gear has upon it a pin 31 extending into an elongated slot 32 in one of the legs 2 of the carrier. A spring 33 having one end secured to a leg 2 and the other end to the side of the gear referred to at 34 draws the leg forward with relation to the pin so that the last normally comes against the rear end of the slot 32 as shown in Fig. 4. The direction of rotation of the carrier is as indicated by the arrow. With this arrangement it will be seen that when the arm 27 comes against one of the projections 26 the paper table will be retarded and the pin 31 will move forward against the forward end of the slot 32 thereby carrying the table forward, the stretching of the spring 33 permitting this. When the arm 27 has passed the projection, however, the carriage will be drawn sharply forward by the spring 33 and the impact of the pin 31 against the rear end of the slot 32 will cause a shock acting substantially horizontal to the paper so as to tend to cause sliding of the surplus particles along the paper surface. At each passage of a projection 26 therefore there will not only be the jar due to the snapping down of the fingers which tends to dislodge the surplus particles of pigment on the paper but there will also be a force acting on these particles parallel to the plane of the paper so that the sliding of these particles from the paper under the action of gravity will be aided with the result that smearing or smudging of the paper by failure to remove surplus pigment will be avoided.

Figure 7:
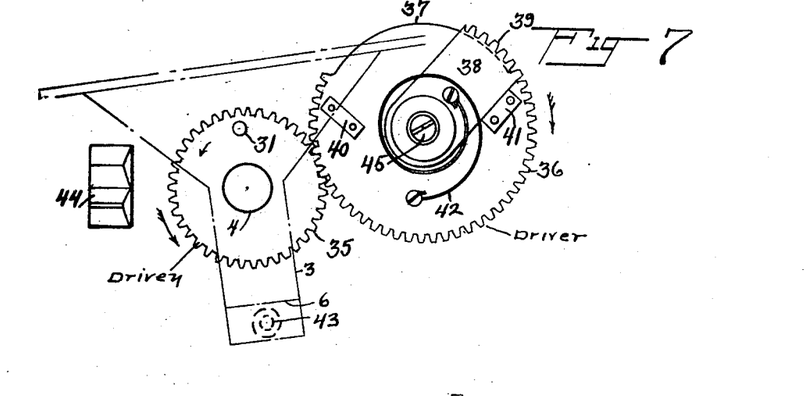
Figs. 7 and 8 are isolated views of the gearing for driving the paper carriage.
Figure 8:
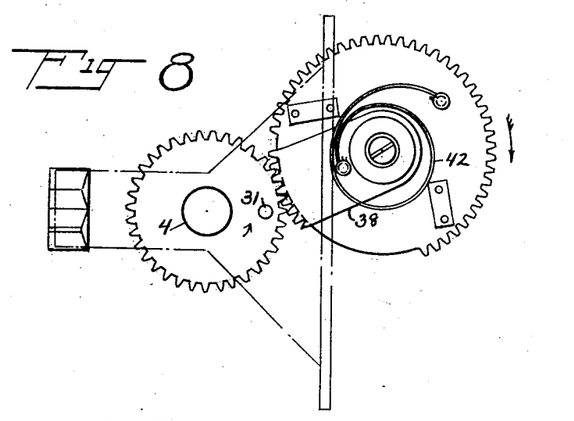

As shown clearly in Figs. 7 and 8 the gear 35 upon which the pin 31 is mounted is driven by a gear 36, the respective directions of rotation being as shown by the arrows. The gear 36 is mutilated having no teeth at 37. Rotatable with relation to the gear 36, however, is a gear segment 38 having at its outer surface gear teeth 39 adapted to form a continuation of the teeth of the gear 36. The movement of the segment 38 in either direction is limited by stops 40 and 41 fixed to the sides of the gear 36 and the segment 38 is normally held against the stop 41 by means of a spring 42. The purpose of this form of gear is to produce a dwell of the carriage with the paper in front of the heater so that the print may receive proper heat treatment. Thus, the initial position of the paper carriage being as shown in Fig. 7, rotation of the gear 36 will cause rotation of the gear 35 and the carriage with it. When, however, the teeth of the gear 35 have come into mesh with the teeth 39 on the segment 38 the driving force upon the gear 36 will merely serve to tense the spring 42 without driving it, the segment 38 meanwhile moving away from the stop 41. During this condition as indicated in Fig. 8, the gear 35 will be at rest and the paper table will be in substantially a vertical position before the heater. This will continue until the segment 38 comes against the stop 40 when the gear 35 will travel off the segment on to the teeth cut in the gear 36 and the remainder of the movement of the table continued. Upon being released the segment 38 will be thrown back against the stop 41 by the spring. An advantage of this particular form of gear is that the teeth 39 being a segment and continuation of the teeth on the gear 36, the teeth of the gear 35 will always properly mesh with the teeth on the gear 36 so that jamming of the gears by the failure to come into proper engagement will be avoided and the parts will always be in proper relationship.

Figure 9:
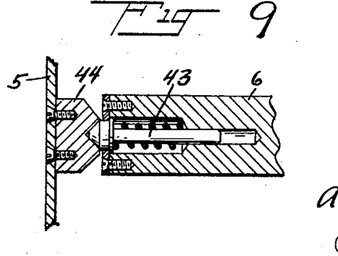
Fig. 9 is a sectional view of a latch for holding the paper carriage.
Figure 10:
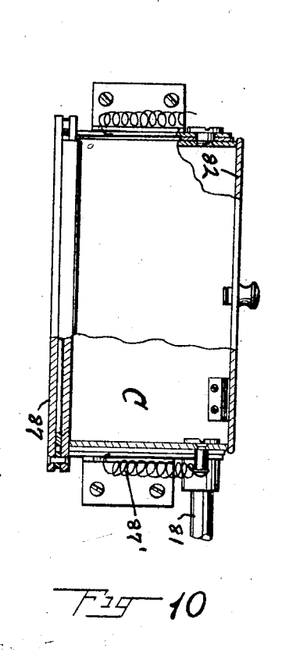
Fig. 10 is a side elevation partly in section of the pigment hopper.
Figure 11:
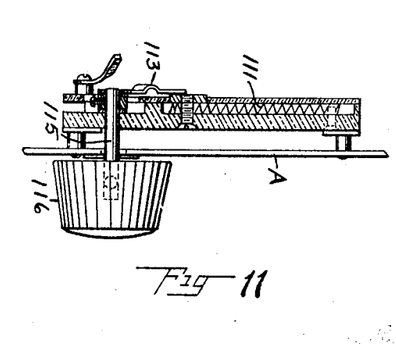
Fig. 11 is a sectional view of the regulating rheostat for the heater.
Figure 12:
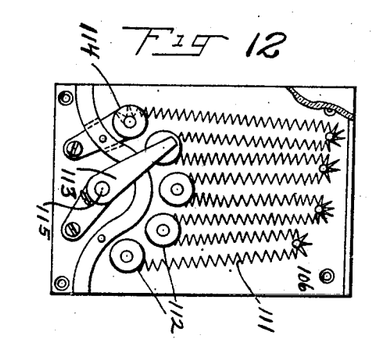
Fig. 12 is an elevation partly broken away showing the arrangement of the resistor in the heater regulating rheostat.

In order that the table may firmly and accurately occupy its position in front of the heater and not be accidentally displaced therefrom, a spring latch 43 (see particularly Fig. 9) is mounted in the end of the bar 6 to slide longitudinally thereof and adapted to snap into a groove in a block 44 secured to the partition 5. The engagement of this latch in its stationary block at the time that the table is in position before the heater will prevent accidental displacement of the paper during this operation but the latch will readily snap out of the groove upon application of power to move the table.

The gear 36 is fixed on a shaft 45 driven through the gears 46 and 47, the latter being fixed to the drum 48 driven by the spring 49, one end of which is secured to the drum and the other to the winding shaft 50. Fixed on the winding shaft 50 is a member 51 having a recess 52 into which a dog 53 is adapted to be pressed by the spring 54. The dog 53 is pivoted upon a disk 55 fixed to the gear 56 and both the gear 56 and disk 55 are rotatable upon the shaft 50. The operating handle E is fixed to a shaft 57 to which is also secured a segmental gear 58 meshing with the gear 56. The turning of the handle therefore in the direction of the arrow (see Fig. 6) will rotate the gear 56 and with it the disk 55 until the dog 53 engages with the recess 52 when the shaft 50 will be turned to wind the spring 49, the usual dog 59 and ratchet 60, the latter being fixed on the shaft 50, prevent unwinding of the spring. The segment 58 is made of such extent that the spring will always be wound in the same degree upon each stroke of the handle. Upon release of the handle it is returned to its initial position against the stop 61 by means of a spring 62, the dog 53 being free to pass over the disk 51 in this direction of movement of the handle.

A gear 63 fixed to the drum 48 drives through a suitable train of gearing to give it a high velocity, a fan 64 which acts as a governor to regulate the speed of the motor.

To insure the stopping of the motor when the carriage is in its initial position there is fixed upon the shaft 45 a disk 65 having a notch 66 into which is adapted to enter the tail 67 of a lever 68 pivoted at 69 when the shaft 45 is in the initial position of the paper carriage. At other times the tail 67 of the lever rides upon the periphery of the disk 65. The tail of the lever 67 is pressed towards the disk 65 by means of a spring 70. The shaft of the fan 64 is provided with a flat surface 71 with which the end of the lever 68 is adapted to engage when the tail 67 is within the slot 66, the shaft then having its movement arrested and so shutting down the motor through the train of reducing gearing as before referred to. During the remainder of the rotation of the shaft 45, however, when the tail 67 rides upon the periphery of the disk 65, the lever 68 will be held free from the shaft of the fan 64 so that the apparatus may be operated under the action of the motor.

In order to insure the giving of the handle a full stroke before the apparatus is set in operation, a projection 72 is fixed to the side of the segment 58 and as the handle is thrown forward this projection near the forward end of the stroke of the handle engages the pin 73 thereby rotating the member 74 which carries the pin 75 so positioned as to engage the lever 68, and when it has been turned sufficiently will force the tail 67 out of the notch in the disk 65 and permit the motor to operate the apparatus.

The projection 15 hereinbefore referred to is on the end of a lever 76 pivoted at 77 and having its tail engaged by a cam 78 on the shaft 45 and being of such conformation that as the paper carriage approaches its initial position the rest 15 is thrust outwardly beneath that carriage, and upon initiation of the carriage movement the rest 15 is withdrawn from beneath the carriage by means of the member 74 coming against the arm 80 fixed on the lever 76 and turns that lever on its pivot so as to withdraw the rest 15 from beneath the paper carriage and permit its moving forward.

Figure 6:
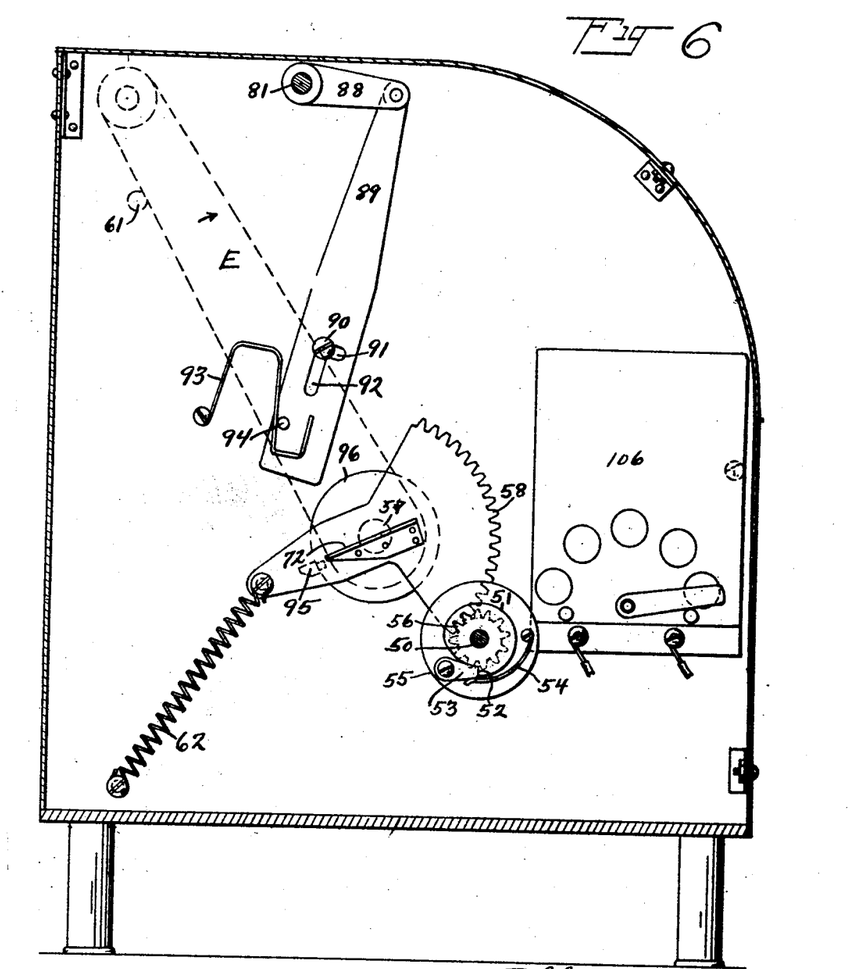
Fig. 6 is a section on the line 6—6 of Fig. 3.

The hopper C for the pigmentizing powder is fixed to the shaft 81 journaled in the casing and has a lid 82 hinged at 83. In the bottom of the hopper is a slot 84 which in the normal position of the hopper registers with a similar slot 85 in a member 86 which is fixed to the casing of the machine. Beneath the slots 84 and 85 is a strip 87 which normally closes those slots and which is secured to the hopper C. The hopper is normally held in the position shown against the stationary member 86 by means of a spring 87 secured at one end to the frame and at the other end to the hopper. The hopper is operated to discharge powdered pigment upon the paper beneath by turning the hopper in the direction of the arrow (Fig. 4) when the slot 84 will be moved above the solid portion of the member 86 so that the hopper will be closed and at the same time the strip 87 will be removed from beneath the slot 85 so that the powder which it contains will fall therefrom upon the paper to be pigmentized. This turning of the hopper is effected by turning the shaft 81 to which it is secured. This shaft has fixed upon it a crank arm 88 pivoted to a link 89 sliding upon the casing and secured thereto by means of a screw 90 entering the right angled slot having the portions 91 and 92. The link 89 is normally pressed into such position that the screw 90 is in registry with the slot 92 by means of a spring 93 fixed at one end to the casing and bearing against a pin 94 in the link 89. The link 89 is thrust upwardly so as to turn the shaft 81 by means of its crank 88, by reason of the projection 95 upon the disk 96 fixed to the handle, coming against the lower end of the link 89 and, upon its release of the link, after the projection 95 has passed, the spring 89 will snap the hopper back into the position as shown in Fig. 4 so as to jar and agitate the contents and thus improve the feed. On the return stroke of the handle the projection 95 forces the lower end of the link 89 to the left (Fig. 6) so as to permit the projection to pass, the link then being forced to the right into the position as shown in Fig. 6.

Figure 13:
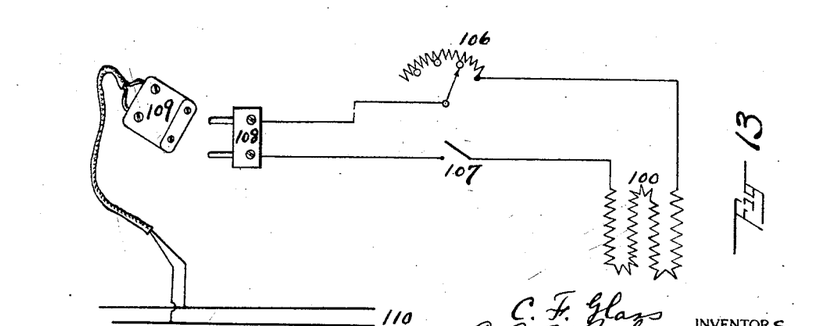
Fig. 13 is a diagram of electrical connections of the heater circuit.

The heater comprises an electric resistor 100 of a wire of suitable material mounted so as to be insulated upon a plate 101 supported on a pedestal 102 secured to the base of the machine but adapted to slide thereon to adjust the heater with relation to the paper carriage, by means of screws 103 sliding in the slots 104 in the base of the machine, the heater being secured in any desired position of adjustment by tightening the screws. The screws being loose the heater may be moved to any desired position of adjustment by means of a finger piece 105 extending from the base of the support 102 to which it is secured, to the outside of the casing. The circuit of the resistor 100 is as indicated in Fig. 13 wherein it will be seen that the resistor 100 is in series with an adjusting rheostat 106 and a switch 107 between the terminals of a plug 108 adapted to cooperate with a socket portion 109 of the connector, the terminals of this socket portion being connected with conductors 110 leading from any suitable source of electric supply. By means of the rheostat the current flowing to the heater and therefore its heat may be regulated so that it may be adapted to fit the needs of various qualities of paper and other conditions. The pedestal 102 may be hinged at 102' so that it may yield rearwardly to permit passage of the carriage but is normally drawn forward into vertical position (see Fig. 4) by a spring 103'. A suitable stop is provided to limit the forward movement of the heater.

The rheostat 106 comprises a resistance wire 111 suitably mounted in an insulated manner upon a plate. Connected at various points of the resistance wire are terminals 112 adapted to be successively engaged by a contact arm 113, one connection of the circuit being made to the arm 113 and the other to one of the extreme terminals as 114. This rheostat may be mounted in any suitable manner upon the casing and the shaft 115 of the movable arm 113 may extend to the exterior of the casing where a knob or handle 116 may be provided for turning it so as to regulate the resistance of the rheostat and thereby the heat of the heater. It is desirable that the supply of current to the heater be regulated so as to take place only when it is desired to utilize the heat for fixing the print as by this means not only is the waste of electric current avoided but the heating up of the apparatus is reduced and furthermore the electric devices may be made smaller with this intermittent operation than would be the case if they were in continuous operation. To this end the supply of current to the heater is controlled by the switch 104 in accordance with the position of the paper carriage. Thus the driving shaft 45 for the paper carriage has fixed upon it a cam 117 which just prior to the movement of the paper comes against the shoulder 118 on a switch lever 119 carrying the bridging contact 120 which, upon raising of the arm 119 by the cam, enters in between and electrically connects the contacts 121 thereby closing the heater circuit. When the arm 119 is not so elevated by the cam 117 the spring 122 holds the contact 120 out of engagement with the contacts 121. The cam 117 is of such extent that the circuit of the heater will be maintained for the desired length of time to give the desired heating effect and at the termination of the elevation of the lever 119 by the cam, the shoulder 123 of the cam will slip off the shoulder 118 on the arm thereby causing a quick movement of the contacts in breaking thereby reducing the danger of damage to the switch by arcing.

While the invention has been illustrated in what is considered its best application it may have other embodiments without departing from its spirit and is not therefore limited to the structures shown in the drawings.

What we claim and desire to secure by Letters Patent is:—

1. In a finger print machine, the combination with a paper carriage having an initial position, a heater and means for rotating said carriage a complete revolution from its initial position, past the fixing means and back to its initial position in each printing operation.

2. In a finger print machine, the combination with means for subjecting the paper to be impressed to a cycle of operations including pigmentizing of the print and fixing the pigment, of a motor operating said means throughout the entire cycle.

3. In a finger print machine, the combination with means for pigmentizing the impressed surface, means for delivering a blow imparting to the particles on the surface force substantially parallel to said surface tending to cause the particles to slide thereon and means for fixing the pigment to the surface.

4. In a finger print machine, the combination with means for subjecting the impressed surface to a cycle of operations including pigmentizing of the print and fixing of the pigment, of motive means operating said means throughout the entire cycle and manipulative means controlling said motive means.

5. In a finger print machine, the combination with a paper carrier of pigmentizing means, means for fixing the pigment and a support for holding said carrier in its initial position, said support being adapted to be moved to permit said carrier to proceed from said position.

6. In a finger print machine, the combination with a paper carrier of a hopper for supplying pigment to the paper, said hopper being movable, means for moving said hopper, means for controlling the exit of pigment from said hopper and pigment fixing means.

7. In a finger print machine, the combination with a paper carrier, of pigment supplying means, pigment fixing means, a motor for operating said carrier and means for defining the starting and stopping of said carrier.

8. In a finger print machine, the combination with a paper carrier, of pigment supplying means, pigment fixing means, motive means for operating said carrier, manipulative means for controlling said motive means and means for insuring full operation of said manipulative means.

9. In a finger print machine, the combination with a paper carrier comprising a movable support for the paper at the impression point when said carrier is in impression position, said support being moved away from the paper when it is out of impression position, of pigment supplying means and pigment fixing means.

10. In a finger print machine, the combination with a paper carrier having paper clamping means, of a reciprocating manipulative means for operating said clamping means, pigment supplying means and pigment fixing means.

11. In a finger print machine, the combination with means for pigmentizing an impressed surface with particles, means for delivering a blow, imparting to the particles of pigment a disturbing force substantially parallel to the surface tending to cause the particles to slide thereon, means for delivering another blow, imparting to the particles a disturbing force perpendicular to the surface tending to cause the particles to become dislodged and means for fixing the pigment to the surface.

12. In a finger print machine, the combination with means for pigmentizing an impressed surface with particles, means for delivering a blow, imparting to the particles a disturbing force perpendicular to the surface tending to cause the particles to become dislodged and means for fixing the pigment to the surface.

13. In a finger print machine, the combination with a paper carrier of means for supplying pigment to an impressed surface on the carrier, a heater for fixing said pigment, means for moving said carrier at a substantially constant velocity and means for changing said velocity on passing said heater.

In testimony whereof we have signed this specification this 12th day of September 1924.

JOHN F. MILLIGAN.
CHARLES F. GLASS.
ALFRED CHARLES OTTO BOCK.